Feb. 28, 1967 D. A. FOGG 3,306,430
BELT-CHAIN COMBINATION DRIVE
Filed May 24, 1965 2 Sheets-Sheet 1

INVENTOR.
DANIEL A. FOGG
*Price & Heneveld*
ATTORNEYS

Feb. 28, 1967  D. A. FOGG  3,306,430
BELT-CHAIN COMBINATION DRIVE
Filed May 24, 1965  2 Sheets-Sheet 2

INVENTOR.
DANIEL A. FOGG
BY
ATTORNEYS

United States Patent Office 3,306,430
Patented Feb. 28, 1967

3,306,430
BELT-CHAIN COMBINATION DRIVE
Daniel A. Fogg, White Cloud, Mich., assignor to Rapids-Standard Company, Inc., Grand Rapids, Mich., a corporation of Michigan
Filed May 24, 1965, Ser. No. 458,010
7 Claims. (Cl. 198—127)

This invention relates to conveyors, and more particularly to "live roller" conveyors.

Live roller conveyors commonly propel articles by rotating the rotatable roller elements with an underlying friction belt driven in the opposite direction to that of intended article movement. These recirculatory friction belts are conventionally driven by a powered cylindrical pulley on one end of the conveyor, and pass around another cylindrical pulley on the other end. To be effective the belt must be held in tension over its length. This is controlled by the use of "take-up" means normally at the far end of the conveyor. Pressure rollers are periodically spaced along the tensioned belt to force the belt up against the rotatable elements.

As is known to those in the conveyor field, friction belt assemblies for live roller conveyor assume a variety of sizes and characteristics depending upon the nature, weight, and size of the conveyor system and articles to be propelled. The greater the conveyor width for example, the stronger the belt must be to handle the larger loads normally encountered with wider conveyors. This is frequently done by making the belt wider. Some belts are relatively stiff, when properly strengthened to accommodate heavy loads, and therefore, require a large diameter drive pulley and idler puley because of the incapacity of the belt to travel in a small arc without belt damage. Also, a large pulley may be required for sufficient power drive surface area to propel the belt, particularly where heavy loads are involved. Presently, therefore, a great variety of belts of different thicknesses and widths are made to suit the particular uses, and a great variety of pulley widths and diameters are made to accommodate different belts and conveyor widths. Literally dozens of combinations can be and are regularly made to meet certain conditions. Consequently, the inventory required is substantial, complex and costly.

The power driven arrangement for the drum type pulleys required assumes a great deal of space beneath the conveyor, especially at the ends. The bearings for the pulleys must also be capable of withstanding large forces due to the fact that the belt must be maintained under a constant predetermined tension or else the equipment will not propel the articles. Then, too, all of the power for the driving force must be applied to the one drive pulley at one end of the conveyor. Therefore, if the conveyor is long and/or the load is substantial, much surface area will be required between this pulley and the belt, causing the necessary pulley to be very large, heavy, and space consuming.

Even when proper belt and pulley combinations are initially obtained, operational difficulties arise constantly due to the tendency of the belts to vary in length, especially with changes in humidity, and therefore, vary in tension. Because the belt must be maintained within a specific tensile range, the special take up assemblies utilized must be constantly adjusted.

Another difficulty associated with present drive belt units is that of maintaining proper tracking of the belt to keep it in proper alignment on the conveyor.

It is an object of this invention to provide a unique conveyor drive propelling means having practically universal adaptability to conveyors of different widths, lengths, and load requirements. The novel propelling means replaces the extensive large inventory of various diameters and lengths of pulleys, and various thicknesses, widths, and rigidity of belts.

Another object of this invention is to provide a conveyor propelling means that, with the cooperative combination of relatively simple means achieves a friction belt drive means that need not be under tension for proper operation. It maintains a dependable preset drive relationship on the rollers of a live roller conveyor day after day without particular attention. It eliminates the need for tension control and take up mechanism on the conveyor. It eliminates the need for pressure rollers along the conveyor.

Another object of this invention is to provide a unique live roller conveyor propelling assembly that is generally universal in application, and that assumes only a small amount of space, typically about as much as normally needed for the smallest conventional units. It achieves higher drive efficiency, enabling the employment of high speed, efficient electric motors.

Aonther object of this invention is to provide live roller conveyor propelling means enabling the use of several drive motors spaced selectively along the conveyor for optimum distribution of power with minimum space consumption. Thus a conveyor section may be of great length, yet without losing drive efficiency or effectiveness, and without tremendous slack take up and belt stretching problems normally encountered.

These and several other objects of this invention will become apparent upon studying the following specification in conjunction with the drawings in which.

Figure 1:
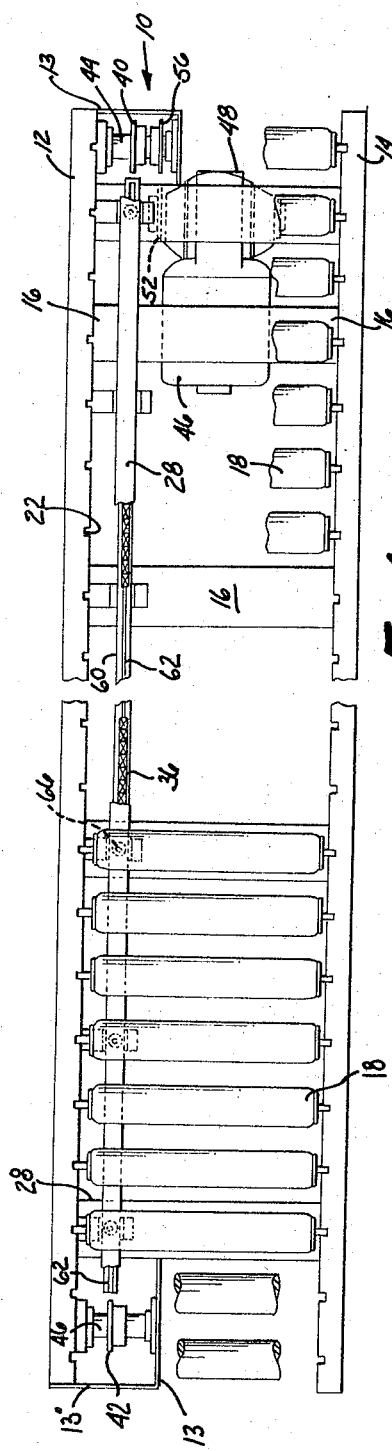
FIG. 1 is a plan fragmentary view of a live roller conveyor section employing the invention.
Figure 2:
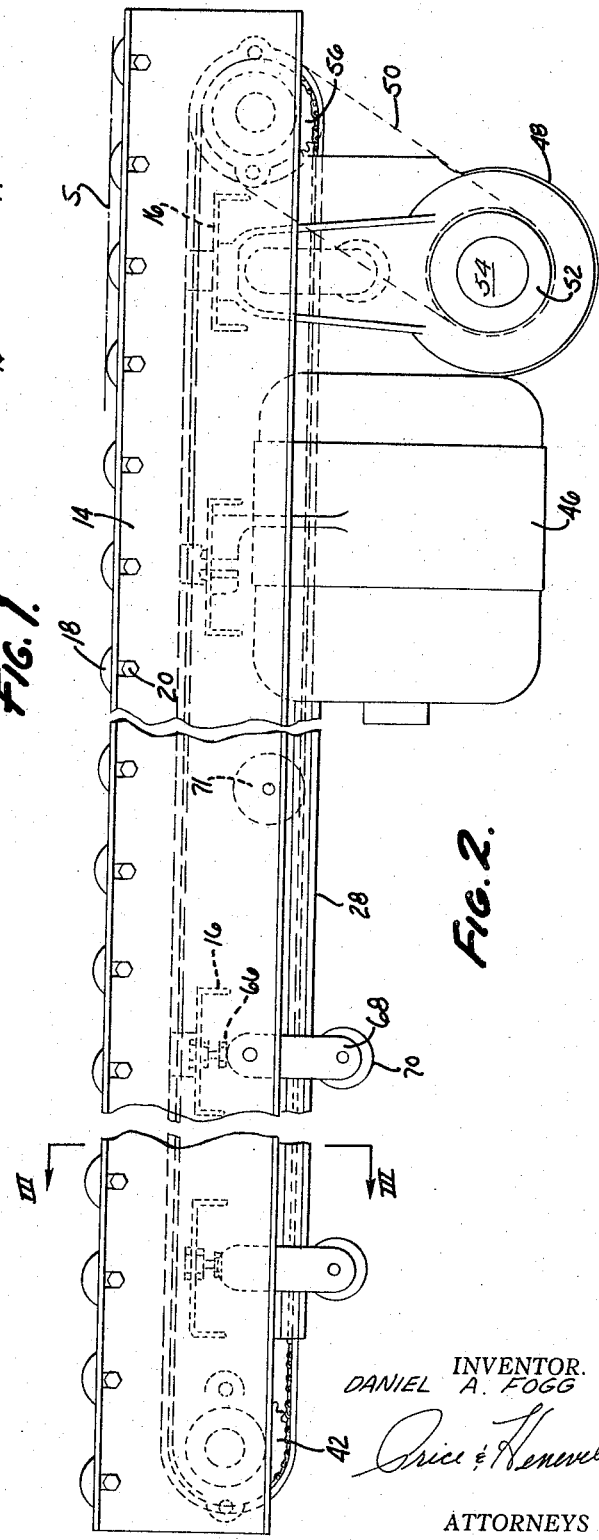
FIG. 2 is a side, elevational, enlarged, fragmentary view of the apparatus in FIG. 1.

Referring now specifically to the drawings, the live roller conveyor assembly 10 includes a pair of spaced, parallel, C-shaped, outwardly facing side rails 12 and 14 interconnected by a plurality of transverse, spaced cross beams 16. The side rails support a plurality of spaced, transverse rotatable roller elements 18. The cross beams 16 may be of channel beam stock or the like. Rotatable elements 18 are preferably in the form of elongated cylindrical rollers having their projecting end pins 20 vertically removably inserted in vertical slot notches 22 in the upper edges of the inside faces of the side rails in conventional fashion.

Figure 4:
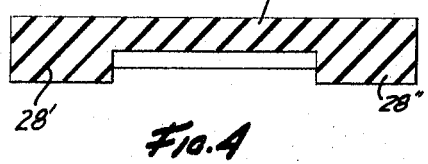
FIG. 4 is an enlarged, sectional view through the belt member in FIGS. 3 and 5.

One surface of friction belt 28 has an undulated configuration in its central portion, to interfit with the chain in drive relationship, straddled by a pair of projecting shoulders 28' and 28'' (FIG. 4) to maintain the belt and chain in lateral alignment. This undulated portion has a generally sinusoidal curvature with deep concavely curved recesses 38 to receive the convexly enlarged pin-receiving ends of the link plates, and intermediate protruding convexly curved portions 38' projecting between the rollers and into the concave link plate recesses between their enlarged ends.

The chain recirculates as by traveling around at least two direction reversing sprockets 40 and 42 on opposite ends of the conveyor. Each sprocket is rotatably suspended on shafts 44 and 46 respectively, which may be mounted between one side rail 12 and cooperative brackets 13 and 13' affixed thereto. At least one of the sprockets, here shown to be sprocket 40, is power driven from an electrical motor 46 and gear box 48 combination. This may be done by powering another chain 50 by drive sprocket 52 on gear box output shaft 54, and driving this chain around sprocket 56 on shaft 44. The motor and gear box assembly can be suspended from the cross beams 16 beneath the conveyor surface.

Figure 6:
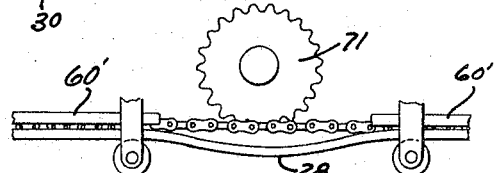
FIG. 6 is a fragmentary elevational view of a portion of the apparatus.

If desired or necessary, additional drive motor and sprocket connections may be engaged with the chain at any place along its length. In so doing, for example, the belt can be dropped slightly away from the chain at any spot. The belt has an overall length sufficiently greater than the chain to allow simple temporary separation thereof for optimum chain and sprocket interengagement. Referring to FIG. 6, for example, by providing a slight gap in the track assembly, positioning a powered sprocket 71 in the gap, and allowing the belt 28 to drop away slightly, full engagement can be obtained between the chain and sprocket. Alternatively the upper pass track can be provided with a gap and the chain diverted downwardly temporarily to engage a drive sprocket for supplemental power.

The differential in lengths between the belt and chain also enables the belt to pass smoothly around the end sprockets without binding, since it forms its own arc slightly spaced from and disengaged from the roller chain. This prevents belt damage from stretching or kinking, and also allows complete engagement of the sprocket into the chain.

Figure 3:
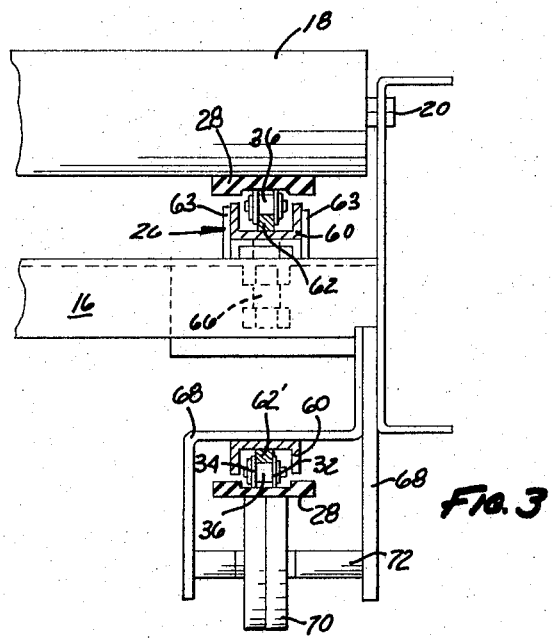
FIG. 3 is a fragmentary, enlarged, sectional view of the apparatus, taken on plane III—III of FIG. 2.
Figure 5:
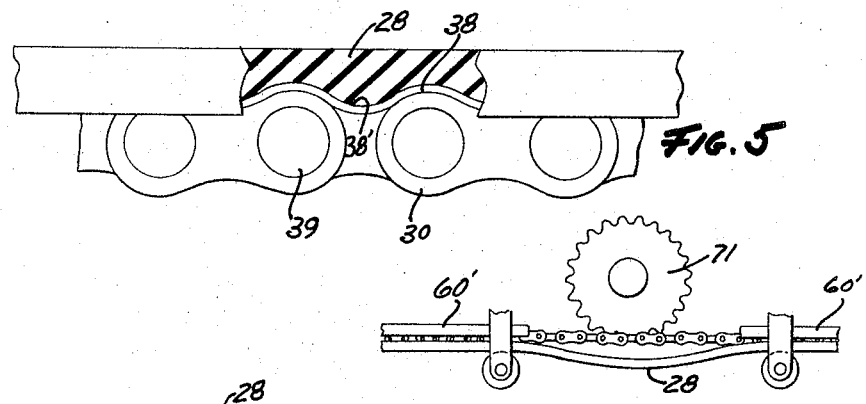
FIG. 5 is an enlarged, fragmentary, partially broken away elevational view of the combination belt and chain in this invention.

As indicated previously, both the chain and belt are continuous and recirculatory, therefore having an upper pass and a lower return pass. In its upper pass, the chain and belt combination is held laterally aligned, and also is selectively positioned with respect to the under surface of rollers 18 by a special guide track means. This includes a support 60 such as a channel shaped element, having a track bar 62 in its center. The track bar fits between the chain link plates and engages the chain roller elements 36 (FIG. 3). The channel shaped element, facing upwardly on the upper pass, is vertically slidable between a pair of parallel straddling flanges 63 affixed as by welding or the like to cross beams 16. The particular vertical position of the chain and belt, and hence the contact relationship of the belt with the rollers is controlled by regulation of height of track 62 and its support channel 60. This may be achieved in a variety of ways, with mechanical, electrical, or fluid operated means, controlled manually or automatically. For purposes of convenience, a simple manually actuated mechanical device is shown. That is, vertical adjustment is made by adjustment of vertical threaded studs 66 extending through the cross beam supports 16 and abutted against the bottom surface of track channel 60. Rotation of these vertical studs raises or lowers the chain track to press the chain against the belt with selected pressure, for controlling the upper belt friction surface pressure against the bottom of rollers 18.

The return lower pass of the chain and belt combination is guided by an inverted channel support 60' with its center track bar 62'. These are mounted to a plurality of straddling suspension brackets 68 affixed to the lower end of the side rail. The belt is supported reasonably close to the chain by passing it over idler rollers 70 rotatably suspended at intervals on axles 72 secured to brackets 68.

The novel combination power drive assembly has proven under extensive experimentation to be extremely advantageous for several reasons. It always assumes only a small amount of space, whether the conveyor is wide or not, and whether power requirements are high or low. It can be employed on a variety of different length conveyors, with equal facility. The roller chain, being extremely strong in tension, will not stretch and can handle very heavy loads on the conveyor. It does not slip on the belt because of its engaged relationship thereto. Yet the chain and belt are freely separable when necessary, to round the sprockets without belt damage, and to enable supplemental power to be applied to the chain. Excellent, controlled frictional relationship exists between the belt and rollers. No pressure rollers are needed at all, and in fact hardly any tensile stress is applied to the belt. The belt need not have special construction for tensile strength therefore, as is usual. There is no problem in maintaining proper "tracking," since the elements cooperatively retain their alignment by their very structure. No extra belt length is required for expansion and contraction or tape up. Other advantages will be apparent to those in the field, such as the tremendous reduction in cost and inventory.

It is realized that the device is very simple. Indeed, one of its major attributes is this very simplicity, in view of the versatility, strength, drive relationship, and small space requirements involved, to replace the complex cumbersome assortment of devices used heretofore.

In this specification and in the claims, the chain is sometimes referred to as the non-stretching member. It will be realized that practically any item of material can be stretched at least some minute amount with application of sufficient tensile force. Indeed, experience with this assembly shows that the roller chain will increase in length a few thousandths of an inch per foot under a few hundred pounds tensile force, but reaches a definite limit of expansion at this point. Within the novel concept, therefore, the chain is considered basically non-stretching in character since this minor expansion is so small and is definitely limited.

It is appreciated that certain details of the structure could be modified to obtain a particular adaptation, suit a particular application, or to drive a particular conveyor arrangement, without departing from the concept presented. Hence, the invention is intended to be limited only by the scope of the appended claims and the reasonably equivalent structures to those defined therein.

I claim:

1. Conveyor apparatus comprising: conveyor means forming a conveyor surface; propelling means for propelling objects on said surface; said propelling means including (a) a continuous roller chain having rollers and roller connecting and straddling side links, and power drive means therefor, and (b) a flexible continuous friction drive belt having a friction face on one side and an undulated central portion on the opposite side removably interfitted with said links of said roller chain; said belt having lateral retention shoulders straddling said central portion; a chain guide and support track in engagement with the rollers of said roller chain, between said links, opposite said belt, to hold said belt and chain in operative drive engagement with each other, and with said conveyor means and to maintain lateral alignment thereof.

2. A live roller conveyor apparatus comprising: spaced support rails, and spaced rotatable elements mounted between said rails, forming a conveying surface; endless propelling means beneath said rotatable elements, including a friction belt and a cooperative drive member; said belt having a friction face normally engageable with the bottom of said rotatable members, and an undulated face opposite said friction face; said drive member being an endless, non-stretching, flexible member having spaced drive surfaces along its length, interfitting in said undulated face to drive said belt; said member being separable from said belt; power drive means operably engaged with said member; and track means retaining said belt and member in interengagement and retaining said belt in engageable relation to said rotatable members.

3. A live roller conveyor apparatus comprising: support structure including spaced support rails; spaced rotatable elements mounted between said rails to provide a conveying surface; endless propelling means beneath said rotatable elements, including a friction belt and a cooperative roller chain; said belt having a friction face engageable with said rotatable members, and having an undulated surface normally in engagement with said roller chain to be driven thereby; track rail means engaging said roller chain and supporting said chain and belt in operative relation with said rotatable members; and power drive means operably connected with said chain to propel said chain, causing said chain to advance said belt, and said belt to rotate said rotatable members.

4. The apparatus in claim 3 wherein said track rail means is shiftable toward and away from said rotatable elements to shift said chain and belt with respect to said rotatable members; and shifting control means between said track rail means and said support structure to control the drive relationship between said chain, belt, and rotatable elements.

5. A live roller conveyor apparatus comprising: support structure including spaced side rails spaced rotatable elements mounted between said side rails to form a conveying surface; propelling means beneath said elements, including a continuous recirculatory friction belt and an endless cooperative recirculatory roller chain; said belt having a friction surface on one side engageable with said rotatable members, having an undulated central portion on the opposite face, and a pair of projecting shoulders astraddle said undulated portion; said roller chain having rollers and straddling link plates, being in driving engagement with said undulated portion and being separable therefrom; track means in engagement with said roller chain, opposite said belt, including a track bar fitting between said link plates and in engagement with said rollers; said track means normally maintaining said chain and belt in driving relationship, and being shiftable toward and away from said rollers; and shifting control means between said track means and said support structure for controlling the relation of said belt to said rotatable elements.

6. A live roller conveyor apparatus comprising: support structure including spaced support rails; spaced rotatable elements mounted between said rails to provide a conveying surface; endless propelling means beneath said rotatable elements, including a friction belt and a cooperative roller chain; said belt having a friction face engageable with said rotatable members, and having an undulated surface normally in engagement with said roller chain to be driven thereby; track rail means engaging said roller chain and supporting said chain and belt in operative relation with said rotatable members; power drive means operably connected with said chain to propel said chain, causing said chain to advance said belt, and said belt to rotate said rotatable members; and supplemental chain drive sprocket means engaged with said chain, spaced from said power drive means.

7. A live roller conveyor apparatus comprising: support structure including spaced side rails spaced rotatable elements mounted between said side rails to form a conveying surface; propelling means beneath said elements, including a continuous recirculatory friction belt and an endless cooperative recirculatory roller chain; said belt having a friction surface on one side engageable with said rotatable members, having an undulated central portion on the opposite face, and a pair of projecting shoulders astraddle said undulated portion; said roller chain having rollers and straddling link plates, being in driving engagement with said undulated portion and being separable therefrom; track means in engagement with said roller chain, opposite said belt, including a track bar fitting between said link plates and in engagement with said rollers; said track means normally maintaining said chain and belt in driving relationship, and being shiftable toward and away from said rollers; shifting control means between said track means and said support structure for controlling the relation of said belt to said rotatable elements; said belt being longer than said chain; said track means being configurated to allow said chain and belt to separate at a position spaced from said power drive means; and supplemental drive sprocket means engaging said chain at said position.

References Cited by the Examiner

FOREIGN PATENTS 1,160,967  8/1958  France.

EVON C. BLUNK, *Primary Examiner.*

EDWARD A. SROKA, *Examiner.*